United States Patent
Hilleary et al.

(10) Patent No.: US 11,157,888 B2
(45) Date of Patent: *Oct. 26, 2021

(54) SYSTEM AND METHOD FOR ENHANCING FINANCIAL TRANSACTIONS AT A POINT-OF-SALE

(71) Applicant: MASTERCARD INTERNATIONAL INCORPORATED, Purchase, NY (US)

(72) Inventors: Shawn Douglas Hilleary, Wentzville, MO (US); Benjamin M. Berger, Rye Brook, NY (US); Jean-Pierre Gerard, Croton-On-Hudson, NY (US); Vincent Morelli, Norwalk, CT (US); Melinda I. Rolfs, Pleasantville, NY (US); Qian Wang, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,573

(22) Filed: Nov. 5, 2019

(65) Prior Publication Data
US 2020/0143350 A1 May 7, 2020

Related U.S. Application Data

(63) Continuation of application No. 15/271,308, filed on Sep. 21, 2016, now Pat. No. 10,496,971.

(51) Int. Cl.
*G06Q 20/20* (2012.01)
*G06Q 20/32* (2012.01)
*G06Q 20/40* (2012.01)

(52) U.S. Cl.
CPC ......... *G06Q 20/20* (2013.01); *G06Q 20/3278* (2013.01); *G06Q 20/401* (2013.01); *G06Q 20/409* (2013.01)

(58) Field of Classification Search
CPC .. G06Q 20/18; G06Q 20/4014; G06Q 20/202; G06Q 20/40145; G06Q 20/20
(Continued)

(56) References Cited

U.S. PATENT DOCUMENTS 7,107,226 B1    9/2006  Cassidy et al.
7,980,466 B2    7/2011  Lee et al.
(Continued)

*Primary Examiner* — Garcia Ade

(57) ABSTRACT

Embodiments of the disclosure enable a computing system to enhance one or more financial transactions. The computing system identifies a cardholder account used to enter into a financial transaction, identifies a merchant and/or a primary product associated with the financial transaction, analyzes cardholder data associated with the cardholder account and account data associated with the merchant and/or the primary product to determine a secondary product, generate presentation data for presenting product information associated with the secondary product, and receive selection data associated with the secondary product such that the financial transaction is enhanced with the secondary product. Aspects of the disclosure provide for enhancing the financial transaction with a secondary product tailored to the cardholder, provided or promoted by the merchant, and/or useable with the primary product in a constructive, complementary, and/or effective manner.

20 Claims, 6 Drawing Sheets

(58) Field of Classification Search
USPC .......................................................... 705/16
See application file for complete search history.

(56) References Cited

U.S. PATENT DOCUMENTS

| | | | |
|---|---|---|---|
| 2002/0188503 A1 | 12/2002 | Banerjee et al. | |
| 2003/0212595 A1* | 11/2003 | Antonucci | G06Q 30/0235 |
| | | | 705/14.27 |
| 2007/0266130 A1* | 11/2007 | Mazur | G06Q 20/32 |
| | | | 709/223 |

\* cited by examiner

SYSTEM AND METHOD FOR ENHANCING FINANCIAL TRANSACTIONS AT A POINT-OF-SALE

CROSS REFERENCE TO RELATED APPLICATION

This application is a continuation of U.S. patent application Ser. No. 15/271,308, filed Sep. 21, 2016, entitled "System and Method for Enhancing Financial Transactions at a Point-Of-Sale", the entirety of which is incorporated by reference.

FIELD OF THE DISCLOSURE

The subject matter described herein relates generally to processing transactions and, more specifically, to systems and methods for enhancing one or more financial transactions at a point-of-sale (POS).

BACKGROUND

Some merchants use promotions to encourage their customers to purchase goods and/or services. With the range of promotions available to a customer, however, identifying a promotion of interest may be tedious, time-consuming, and/or overwhelming. For example, promotions generated based on general industry data or conventional knowledge typically target a middle range of the general public and, thus, may not be relevant to at least some customers.

To target their own customers, at least some merchants employ a customer loyalty program that generates merchant-oriented data. Such data, however, is typically limited to data pertaining to customers' spend at the merchant and, if the customers do not consistently present the customer loyalty cards with each interaction, the data may not be representative of the customers' interests, preferences, and/or tendencies.

SUMMARY

Embodiments of the disclosure enable a computing system to enhance one or more financial transactions. The computing system includes one or more memory devices storing data associated with one or more cardholder accounts and computer-executable instructions, and one or more processors configured to execute the computer-executable instructions to identify a first cardholder account used to enter into a financial transaction, identify a merchant and/or at least one primary product associated with the financial transaction, analyze cardholder data associated with the first cardholder account and account data associated with the merchant and/or the primary product to determine one or more secondary products, generate presentation data for presenting product information associated with the secondary products, and receive selection data associated with at least one secondary product such that the financial transaction is enhanced with the secondary product.

In another aspect, one or more computer storage media embodied with instructions executable by one or more processors for enhancing one or more financial transactions are provided. The computer storage media includes a primary transaction component, and a secondary transaction component. The primary transaction component identifies a cardholder account used to enter into a financial transaction, and identifies a merchant and/or at least one primary product associated with the financial transaction. The secondary transaction component determines one or more secondary products based on the cardholder account and the merchant and/or the primary product, generates presentation data for presenting product information associated with the secondary products, and receives selection data associated with at least one secondary product such that the financial transaction is enhanced with the secondary product.

In yet another aspect, a computer-implemented method is provided for enhancing one or more financial transactions. The computer-implemented method includes identifying a cardholder account used to enter into a financial transaction, identifying a merchant and/or at least one first product associated with the financial transaction, analyzing cardholder data associated with the cardholder account and account data associated with the merchant and/or the first product to determine one or more second products configured to enhance the financial transaction, generating presentation data for presenting product information associated with the second products, and receiving selection data associated with at least one second product such that the financial transaction is enhanced with the second product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
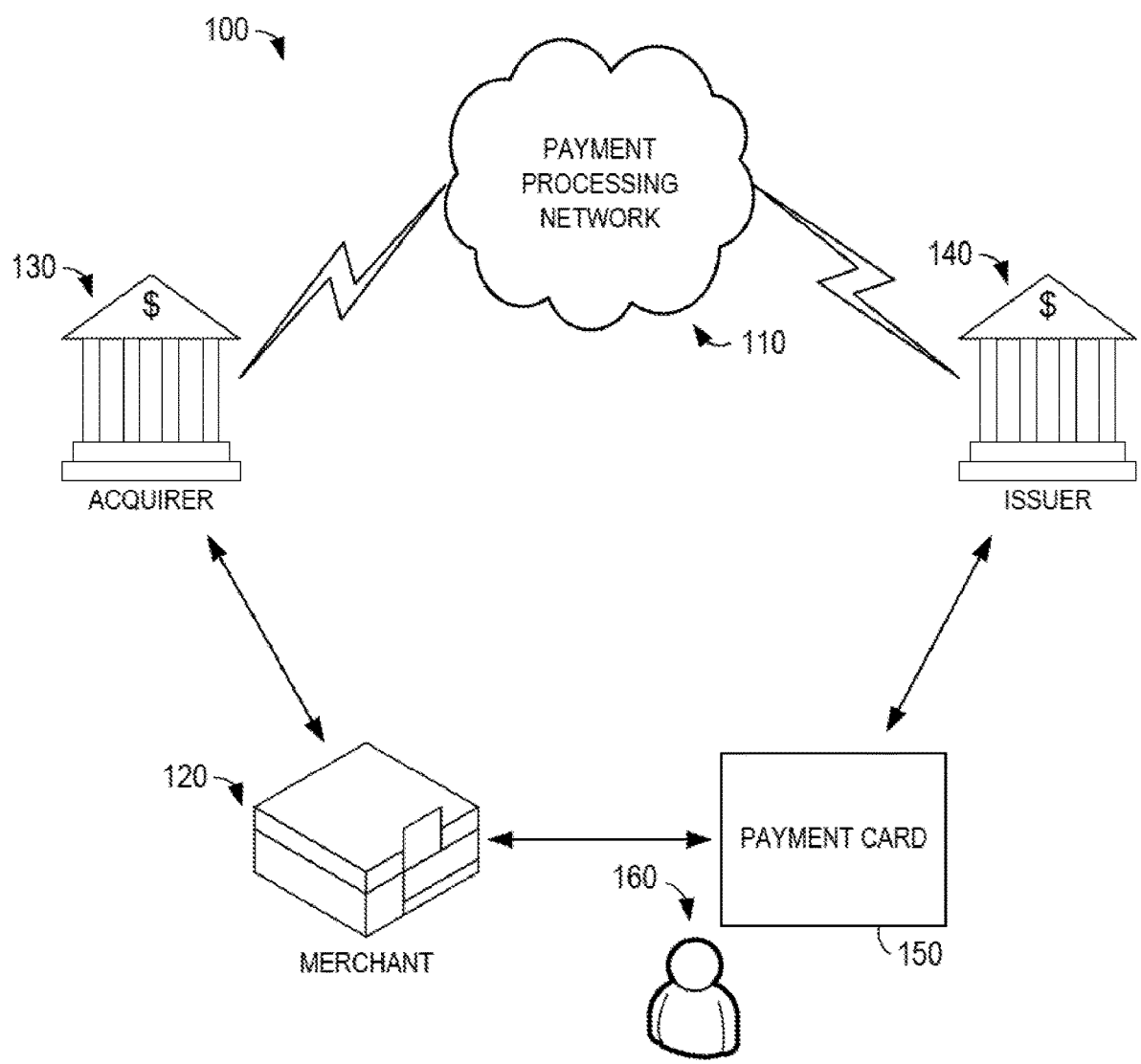
FIG. 1 is a block diagram illustrating an example environment for processing one or more financial transactions.

The subject matter described herein relates to systems and methods for enhancing one or more financial transactions at a point-of-sale (POS). A POS may refer, for example, to a location at which a customer enters into a financial transaction. Embodiments of the disclosure enable one or more opportunities for enhancing a financial transaction to be identified. Additionally, the embodiments described herein facilitate using at least one of the identified opportunities to enhance the financial transaction. Such opportunities may include or be associated with, for example, a product (e.g., a good or service) tailored to the customer that entered into the financial transaction, a product provided or promoted by a merchant associated with the financial transaction, and/or a product useable with a primary product associated with the financial transaction in a constructive, complementary, and/or effective manner.

Aspects of the disclosure provide for a computing system that processes one or more financial transactions in an environment including a plurality of devices coupled to each other via a network (e.g., a local area network (LAN), a wide area network (WAN), the Internet). For example, a system server may be used to communicate with one or more other computing systems (e.g., a merchant system, an account system, a user device) to identify and obtain account data associated with a cardholder, a merchant, and/or a product associated with a financial transaction, use the account data to generate and transmit presentation data associated with one or more opportunities for enhancing the financial transaction, and receive selection data associated with a selected opportunity such that the selected opportunity may be used to enhance the financial transaction. In this manner, data associated with a present financial transaction may be efficiently obtained from a plurality of data sources, and the data may be timely used to enhance the present financial transaction.

The systems and processes described herein may be implemented using computer programming or engineering techniques including computer software, firmware, hardware or a combination or subset thereof. At least one technical problem with known systems is that, with the sheer magnitude of content available or accessible to a computing system, it can be difficult, time-consuming, and/or onerous to identify content of interest. Another technical problem with at least some known systems is that the data used to generate and/or identify content may be dated, limited, and/or irrelevant, resulting in the content itself being dated, limited, and/or irrelevant. The embodiments described herein address at least these technical problems.

By processing financial transactions in the manner described in this disclosure, some embodiments improve user experience, user efficiency, user interaction performance, and/or communication between systems by using a central system server to communicate with one or more other computing systems to identify data associated with a present financial transaction, and use the identified data to determine one or more products that may be used to enhance the present financial transaction. Additionally, some embodiments may reduce processor load by reducing an amount of data to be analyzed or processed, reduce network bandwidth usage by reducing an amount of data to be transmitted, improve processor security and/or data transmission security by managing access to various accounts, and/or reduce error rate by automating the analysis and processing of financial transactions.

The technical effect of the systems and processes described herein is achieved by performing at least one of the following operations: a) receive a request for authorization associated with a financial transaction; b) identify a cardholder account used to enter into the financial transaction; c) identify a merchant and/or a primary product associated with the financial transaction; d) determine whether the request for authorization includes account data associated with the merchant and/or the primary product; e) generate a request for information associated with the merchant and/or the primary product; f) receive account data associated with the merchant and/or the primary product; g) analyze cardholder data associated with the cardholder account and the account data to determine a secondary product; h) generate presentation data for presenting product information associated with the secondary product; i) analyze the cardholder data to identify the presentation device; j) receive selection data associated with the secondary product; and/or k) generate a response to the request for authorization.

FIG. 1 is a block diagram illustrating an example environment 100 for processing one or more financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data 430 between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. In some embodiments, the payment card 150 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 150 to purchase a good or service from a merchant 120. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 160 may use any payment product that is linked or associated with a corresponding cardholder account maintained by an issuer 140. As described herein, the term "payment card" includes credit cards, debit cards, prepaid cards, digital cards, smart cards, and any other payment product that is linked or associated with a corresponding cardholder account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions including e-commerce transactions, card-not-present transactions, or card-on-file transactions).

Account information may include a name of the cardholder 160, an account number, an expiration date, and/or a security code (such as a card verification value (CVV), a card verification code (CVC), and the like).

The merchant 120 requests authorization from an acquirer 130 for at least the amount of the purchase. The merchant 120 may request authorization using any financial transaction computing device configured to transmit the account information of the cardholder 160 to one or more financial transaction processing computing devices of the acquirer 130. For example, the merchant 120 may request authorization through a point-of-sale (POS) terminal, which reads account information from a microchip or magnetic stripe on the payment card 150, and transmits the account information to the one or more financial transaction processing computing devices of the acquirer 130. For another example, the POS terminal reads account information from a device configured to communicate with the POS terminal using contactless payment technology, and transmits the account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information matches or corresponds to the account information of the issuer 140, whether the cardholder account is in good standing, and/or whether the purchase is covered by (e.g., less than) a credit line or account balance associated with the cardholder account. Based on these determinations, the financial transaction processing computing devices of the issuer 140 may determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer 130 for reimbursing the merchant 120. When a credit card is used, the issuer 140 may bill the cardholder 160 to settle the cardholder account (e.g., a credit card account). When a debit or prepaid card is used, the issuer 140 may automatically withdraw funds from the cardholder account (e.g., a checking account, a savings account).

Figure 2:
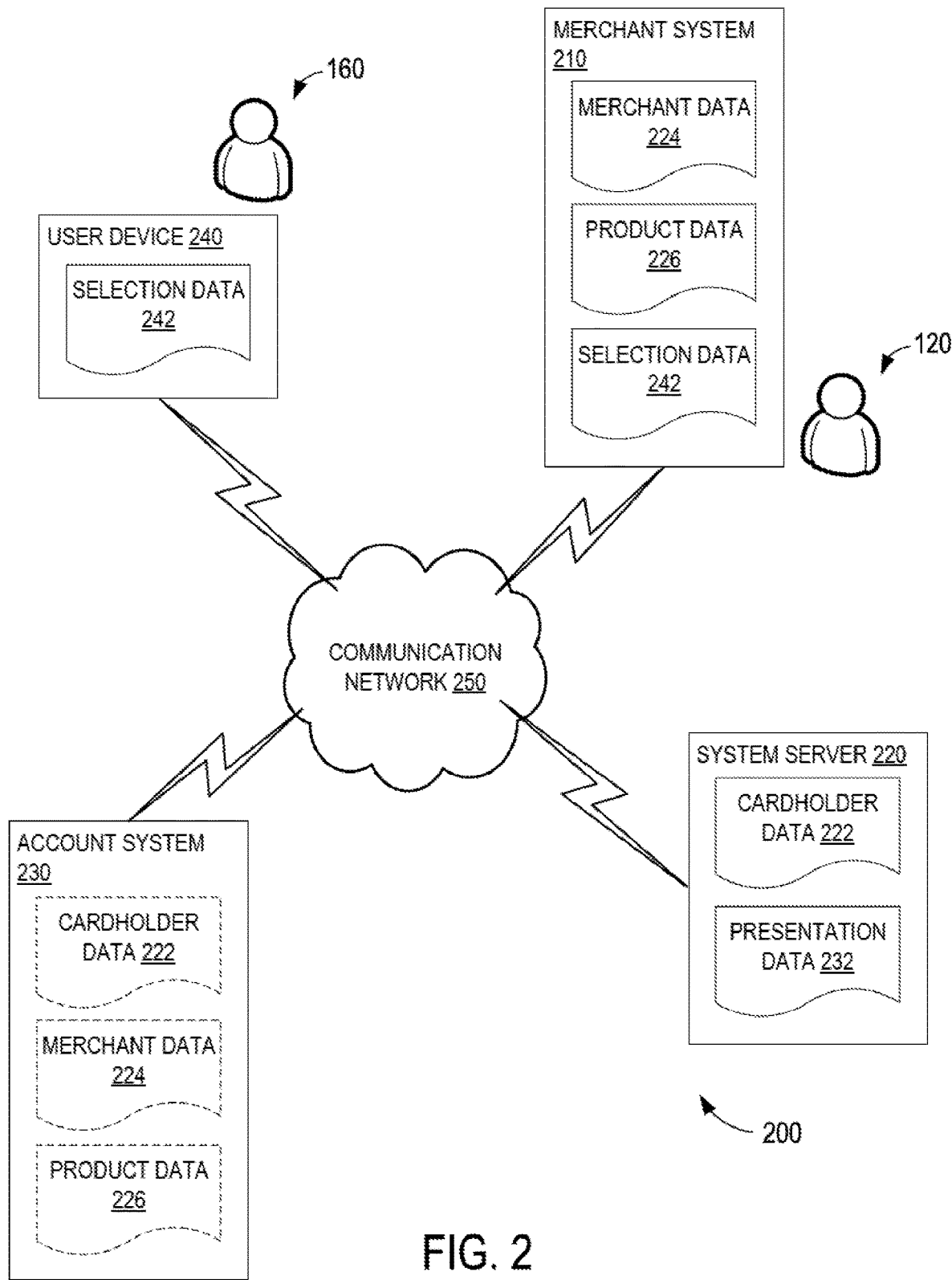
FIG. 2 is a block diagram illustrating an example ecosystem for enhancing one or more financial transactions.

FIG. 2 is a block diagram illustrating an example ecosystem 200 that includes a merchant system 210 (e.g., POS terminal) that allows a customer, such as a cardholder 160, to enter into one or more financial transactions. For example, a merchant 120 may receive cardholder account information (e.g., name of the cardholder 160, cardholder account identifier, expiration date, security code) from the cardholder 160 at the merchant system 210 for entering into a financial transaction associated with at least one primary product (e.g., a first good or service).

Based on the received cardholder account information, the merchant system 210 may generate a request for authorization, and transmit the request for authorization to a system server 220 (e.g., a financial transaction processing computing device of the issuer 140) that stores and maintains data associated with one or more cardholder accounts. The request for authorization may include, for example, transaction data associated with the financial transaction, such as the cardholder account information and a transaction amount associated with the financial transaction.

In response to receiving a request for authorization, the system server 220 is configured to process the request for authorization to identify a cardholder account used to enter into the financial transaction. For example, the cardholder account information included in the request for authorization may be used to identify or select, from the cardholder accounts stored and maintained at the system server 220, a first cardholder account. In some embodiments, the first cardholder account includes or is associated with account data, such as data associated with the cardholder 160 (e.g., cardholder data 222). Cardholder data 222 may include, for example, a user identifier (e.g., an identification number, biometric data), a geolocation (e.g., street address, city, state, Zone Improvement Plan (ZIP) code), a transaction history, an employment status, an income level, an amount of liquid assets, an amount of recurring payments (e.g., housing payment), a debt level, a debit-to-income ratio, a credit score, contact data (e.g., home address, telephone number, email address), and/or user preferences.

The system server 220 is configured to analyze the account data associated with the first cardholder account to process the financial transaction. For example, the system server 220 may identify an account threshold (e.g., available credit line, available account balance) associated with the first cardholder account, and determine whether the transaction amount satisfies the account threshold. If the transaction amount satisfies the account threshold (e.g., the transaction amount is less than or equal to the account threshold), the system server 220 may approve the request for authorization and generate a response to the request for authorization in accordance with the approval. On the other hand, if the transaction amount does not satisfy the account threshold (e.g., the transaction amount is greater than the account threshold), the system server 220 may decline the request for authorization and generate a response to the request for authorization in accordance with the declination.

In some embodiments, the system server 220 identifies the merchant 120 and/or primary product associated with the financial transaction for enhancing the financial transaction. For example, the system server 220 may analyze the request for authorization to identify account data associated with the merchant 120 (e.g., merchant data 224) and/or with the primary product (e.g., product data 226). Merchant data 224 may include, for example, a merchant identifier (e.g., an identification number), a geolocation (e.g., street address, city, state, ZIP code), an industry (e.g., North American Industry Classification System (NAICS) code), an ownership status, a footprint, a sales volume, a foot traffic volume, a product range, a target market, and/or a consumer interface. Product data 226 may include, for example, a product identifier (e.g., an identification number, Universal Product Code (UPC) data, stock-keeping unit (SKU) data), a product specification, a product type (e.g., North American Product Classification System (NAPCS) code), a quantity, an availability, a price, a list of associated products (e.g., other products useable with the primary product in a constructive, complementary, and/or effective manner), and/or a promotion or discount.

Additionally or alternatively, the system server 220 may communicate with one or more other computing systems, such as an account system 230, to obtain cardholder data 222, merchant data 224, and/or product data 226 for enhancing the financial transaction. The account system 230 may include or be associated with any entity that enables the system server 220 to function as described herein including, without limitation, a government agency, a business organization, a membership organization, and/or a registry.

The cardholder data 222, merchant data 224, and/or product data 226 may be used to enhance the financial transaction. For example, the system server 220 may analyze the cardholder data 222 and the merchant data 224 and/or product data 226 to identify or determine one or more secondary products (e.g., a second good or service) that may be used to enhance the financial transaction. The identified secondary product may be, for example, tailored to the cardholder 160, provided or promoted by the merchant 120, and/or useable with the primary product for enhancing the financial transaction. In some embodiments, one or more secondary products may be identified or determined to enhance a payment card-based financial transaction and/or a cash-based financial transaction.

Upon determining the secondary products, the system server 220 is configured to generate presentation data 232 for presenting product information associated with the determined secondary products. In some embodiments, the system server 220 identifies a delivery mechanism (e.g., a presentation device) configured to present information, and uses the delivery mechanism to present the product information to a user of the delivery mechanism (e.g., merchant 120, cardholder 160). The delivery mechanism may be identified, for example, based on cardholder data 222, merchant data 224, and/or product data 226.

In some embodiments, the system server 220 identifies the merchant system 210 as the presentation device, and transmits the presentation data 232 to the merchant system 210 to enable the merchant 120 to present the product information to the cardholder 160. Additionally or alternatively, the system server 220 may identify a user device 240 as the presentation device, and transmit the presentation data 232 to the user device 240 (e.g., via push notification, email, text message, telephone call, and/or voicemail) such that the user device 240 is configured to present the product information to the cardholder 160. Upon receiving selection data 242 that indicates a selection of at least one secondary product, the system server 220 is configured to enhance the financial transaction with the secondary product.

The ecosystem 200 includes one or more communication networks 250 that enable data to be transferred between a plurality of computing devices (e.g., merchant system 210, system server 220, account system 230, user device 240) coupled to the communication network 250. Example communication networks 250 include a cellular or mobile network and the Internet. Alternatively, the communication network 250 may be any communication medium that enables the ecosystem 200 to function as described herein including, for example, a personal area network (PAN), a LAN, and/or a WAN.

Figure 3:
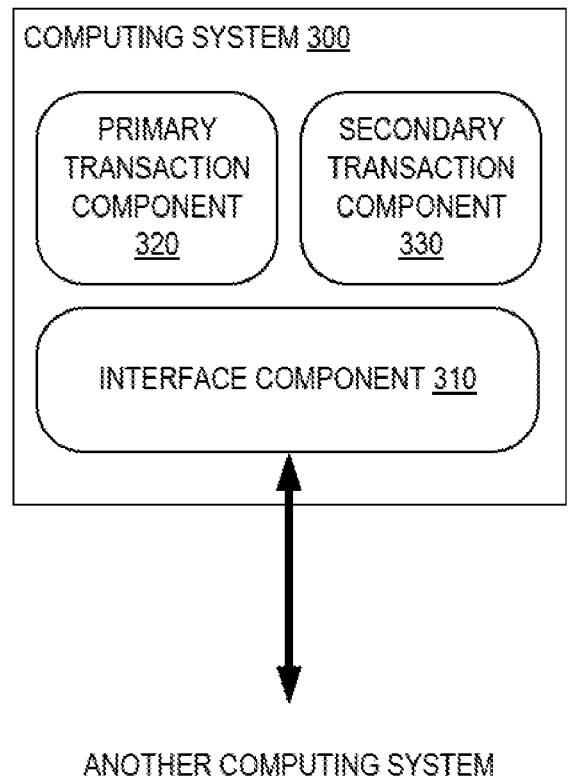
FIG. 3 is a block diagram illustrating a computing system that includes a plurality of example components that may be used to enhance one or more financial transactions.

FIG. 3 is a block diagram illustrating an example computing system 300 (e.g., system server 220) that allows a cardholder 160 to enter into one or more financial transactions and enhance the financial transactions. For example, the computing system 300 may facilitate enhancing a financial transaction associated with one or more primary products with one or more secondary products. To enable the computing system 300 to process one or more transactions in the manner described in this disclosure, the computing system 300 may include an interface component 310, a primary transaction component 320, and/or a secondary transaction component 330.

The interface component 310 enables the computing system 300 to receive data from and/or transmit data to another computing system, such as the merchant system 210 (shown in FIG. 2), the account system 230 (shown in FIG. 2), and/or the user device 240 (shown in FIG. 2). For example, the interface component 310 may be configured to communicate with the merchant system 210 to receive a request for authorization associated with a financial transaction and transmit a response to the request for authorization. Additionally, the interface component 310 may be configured to communicate with a presentation device associated with the merchant system 210 and/or the user device 240 to transmit product information associated with one or more secondary products and receive selection data 242 that indicates a selection of at least one secondary product.

In some embodiments, the interface component 310 is coupled to a communication network 250 (shown in FIG. 2) that facilitates communication between the computing system 300 and one or more other computing systems (e.g., merchant system 210, account system 230, user device 240). Additionally or alternatively, the interface component 310 may be coupled to the primary transaction component 320 and to the secondary transaction component 330 to facilitate inter-computing system 300 communication between the interface component 310, primary transaction component 320, and the secondary transaction component 330, and/or intra-computing system 300 communication between the primary transaction component 320 and/or the secondary transaction component 330 and one or more other computing systems.

The primary transaction component 320 enables the computing system 300 to process one or more financial transactions associated with the primary product. In some embodiments, the primary transaction component 320 is configured to receive (e.g., via the interface component 310) a request for authorization associated with a financial transaction, identify a cardholder account used to enter into the financial transaction, identify a merchant 120 and/or a primary product associated with the financial transaction, generate a response to the request for authorization, and/or transmit (e.g., via the interface component 310) the response.

The secondary transaction component 330 enables the computing system 300 to process one or more financial transactions associated with the secondary product. In some embodiments, the secondary transaction component 330 is configured to analyze cardholder data 222, merchant data 224, and/or product data 226 to determine one or more secondary products, generate and transmit (e.g., via the interface component 310) presentation data 232 for presenting product information associated with the secondary products, receive (e.g., via the interface component 310) selection data 242 associated with at least one secondary product, and process the selection data 242 to enhance the financial transaction with the secondary product.

In some embodiments, the secondary transaction component 330 uses cardholder data 222 stored and maintained at the system server 220 to determine the secondary products. Additionally or alternatively, the secondary transaction component 330 may communicate with another computing system (e.g., merchant system 210, account system 230, user device 240) to obtain cardholder data 222 from the other computing system for using the obtained cardholder data 222 to determine the secondary products. For example, the secondary transaction component 330 may be configured to generate and transmit (e.g., via the interface component 310) a request for information associated with the cardholder 160 to the account system 230 for obtaining cardholder data 222 from the account system 230.

In some embodiments, the secondary transaction component 330 may communicate with another computing system (e.g., merchant system 210, account system 230, user device 240) to obtain merchant data 224 and/or product data 226 from the other computing system for using the obtained merchant data 224 and/or product data 226 to determine the secondary products. For example, the secondary transaction component 330 may be configured to generate and transmit (e.g., via the interface component 310) a request for information associated with the merchant 120 and/or primary product to the account system 230 for obtaining merchant data 224 and/or product data 226 from the account system 230. Additionally or alternatively, the secondary transaction component 330 may use merchant data 224 and/or product data 226 stored and maintained at the system server 220 to determine the secondary products. In some embodiments, the secondary transaction component 330 determines whether the secondary transaction component 330 includes, stores, or has access to the merchant data 224 and/or product data 226, and, if the secondary transaction component 330 does not include, store, or have access to the merchant data 224 and/or product data 226, transmits the request for information for obtaining the merchant data 224 and/or product data 226.

The secondary transaction component 330 is configured to identify one or more presentation devices for presenting product information associated with the secondary products. If the merchant system 210 is identified as the presentation device, the secondary transaction component 330 may transmit (e.g., via the interface component 310) the presentation data 232 to the merchant system 210 for presenting product information and prompting a user of the merchant system 210 (e.g., the merchant 120) to select at least one secondary product for enhancing the financial transaction. The merchant 120 may communicate with the cardholder 160, for example, to present the product information to the cardholder 160, and select at least one secondary product for the cardholder 160. On the other hand, if the user device 240 is identified as the presentation device, the secondary transaction component 330 may transmit (e.g., via the interface component 310) the presentation data 232 to the user device 240 for presenting the product information and prompting a user of the user device 240 (e.g., the cardholder 160) to select at least one secondary product for enhancing the financial transaction.

In some embodiments, the secondary transaction component 330 processes a single, enhanced financial transaction in which a single payment may be made in exchange for the primary product and the secondary product. For example, the presentation data 232 may be transmitted (e.g., via the interface component 310) for presenting product information prior to processing a payment for the primary product (e.g., before a response to the request for authorization is generated or transmitted). In this manner, the cardholder 160 may be allowed to purchase the secondary product before or substantially concurrently with the primary product. If selection data 242 associated with the secondary product is received (e.g., via the interface component 310) prior to processing the payment for the primary product and if the primary product and the secondary product are available for purchase from the merchant 120, the secondary transaction component 330 may be configured to process a single, enhanced financial transaction associated with the primary product and the secondary product. For example, the response to the request for authorization may be generated to include or be associated with a disposition (e.g., approval, declination) of the single, enhanced financial transaction.

Alternatively, a first payment may be made in exchange for the primary product in a first financial transaction, and a second payment may be made in exchange for the secondary product in a distinct, second financial transaction such that the secondary product enhances the first financial transaction. For example, the presentation data 232 may be transmitted (e.g., via the interface component 310) substantially concurrently with or after the response to the request for authorization is generated or transmitted for presenting product information associated with the secondary product. In this manner, the cardholder 160 may be allowed to purchase at least one secondary product after the primary product. In some embodiments, the response to the request for authorization associated with the first financial transaction may be generated to include or be associated with the presentation data 232 such that the presentation data 232 is transmittable (e.g., via the interface component 310) with the response to the request for authorization. If selection data 242 associated with the secondary product is received (e.g., via the interface component 310) subsequent to processing the payment for the primary product (e.g., after the response to the request for authorization associated with the first financial transaction is generated or transmitted), the secondary transaction component 330 may be configured to identify selection data 242 as a request for authorization associated with a second financial transaction, and generate a response to the request for authorization to include or be associated with a disposition of the second financial transaction.

For another example, the secondary product may be available for purchase from an entity other than the merchant 120 (e.g., the secondary product is not available for purchase from the merchant 120). In this manner, the cardholder 160 may be allowed to purchase at least one secondary product from another entity (e.g., another merchant 120). In some embodiments, the secondary transaction component 330 identifies another computing system, such as another merchant system 210, that allows the cardholder 160 to purchase one or more secondary products from an entity associated with the other computing system. If selection data 242 indicates a selection of at least one secondary product that is associated with an entity other than the merchant 120, the secondary transaction component 330 may be configured to identify the financial transaction associated with the primary product as a first financial transaction, and the selection data 242 as a request for authorization associated with a second financial transaction. The first financial transaction and the second financial transaction may be independently processed. For example, the secondary transaction component 330 may be configured to generate a response to the request for authorization associated with the first financial transaction to include or be associated with a disposition of the first financial transaction, and a response to the request for authorization associated with the second financial transaction to include or be associated with a disposition of the second financial transaction.

Figure 4:
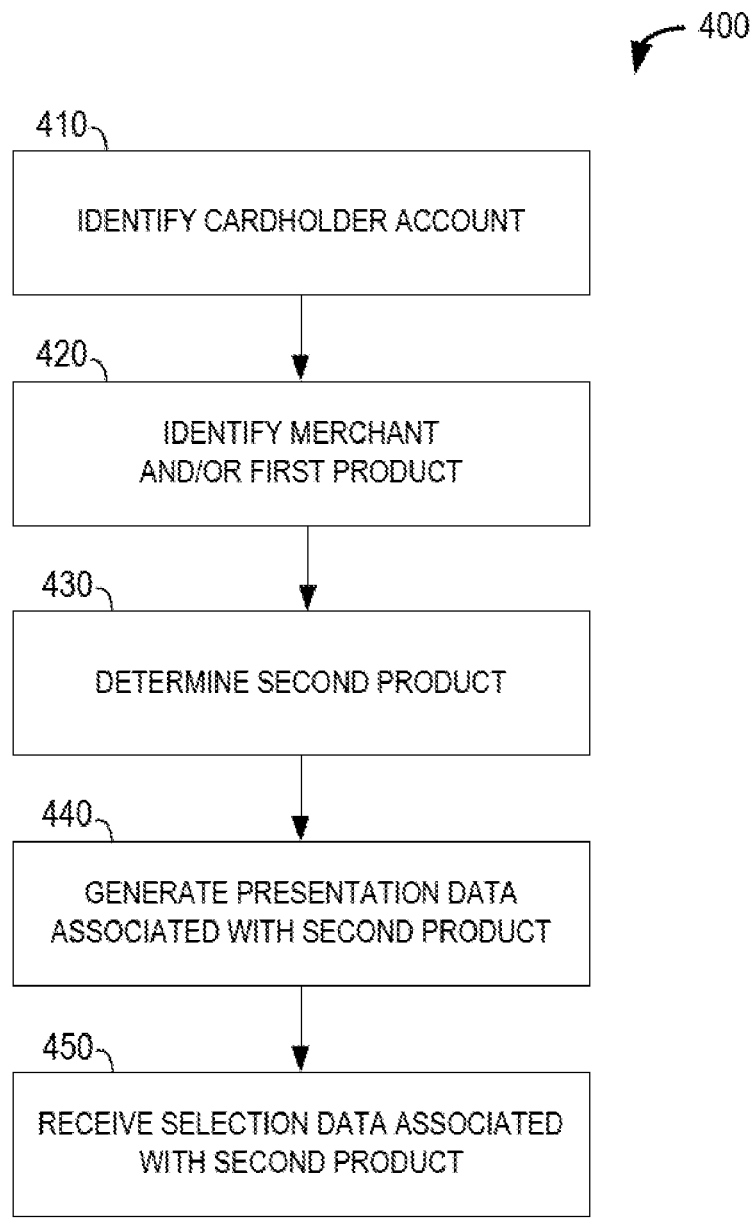
FIG. 4 is a flowchart of an example method that may be used for enhancing one or more financial transactions using a computing system, such as the computing system shown in FIG. 3.

FIG. 4 is a flowchart of an example method 400 for enhancing one or more financial transactions using a computing system, such as a system server 220 (shown in FIG. 2). In some embodiments, the system server 220 receives a request for authorization associated with a financial transaction. The request for authorization may include at least some data useable to process the financial transaction. For example, the request for authorization may include cardholder account information (e.g., cardholder account identifier, expiration data, security code) that may be used to identify at 410 a cardholder account used to enter into the financial transaction, and transaction data (e.g., a transaction amount) that may be used to determine whether to approve or decline the request for authorization. In some embodiments, the cardholder account information is used to access the cardholder account and identify account data (e.g., account threshold) stored and maintained at the system server 220. The transaction amount may be compared to the account threshold for determining whether to approve or decline the request for authorization. For example, if the transaction amount is less than or equal to an account threshold (e.g., available credit line, available account balance) associated with the identified cardholder account, the request for authorization may be approved. On the other hand, if the transaction amount is greater than the account threshold, the request for authorization may be declined.

In addition to being used for processing the financial transaction, the cardholder account information and/or the transaction data may be used for enhancing the financial transaction. In some embodiments, at least some account data stored and maintained at the system server 220, such as cardholder data 222, may be used to identify the cardholder 160 and one or more characteristics associated with the cardholder 160. Additionally or alternatively, the request for authorization may be generated to include account data (e.g., merchant data 224, product data 226) stored and maintained at the merchant system 210, such that the account data may be used to identify at 420 the merchant 120 and/or one or more primary products associated with the financial transaction and one or more characteristics associated with the merchant 120 and/or the primary products.

Cardholder data 222, merchant data 224, and/or product data 226 may be used to determine at 430 one or more secondary products configured to enhance the financial transaction. The determined secondary products may be, for example, tailored to the cardholder 160, provided or promoted by the merchant 120, and/or useable with the primary product in a constructive, complementary, and/or effective manner. Additionally or alternatively, the secondary products may be determined based at least partially on data other than that included in the request for authorization or stored and maintained at the system server 220.

In some embodiments, the system server 220 determines whether the data at the system server 220 (e.g., data obtained from another computing system and/or stored and maintained at the system server 220) does not satisfy a predetermined data threshold, and, on condition that the predetermined data threshold is not satisfied, communicates with one or more other computing systems to obtain data for determining the secondary products. For example, the system server 220 may communicate with the merchant system 210 to obtain cardholder data 222, merchant data 224, and/or product data 226 stored and maintained at the merchant system 210 that is not included in the request for authorization. For another example, the system server 220 may communicate with an account system 230 to obtain cardholder data 222, merchant data 224, and/or product data 226 stored and maintained at the account system 230. The account system 230 may be identified, for example, based on account data at the system server 220. For yet another example, the system server 220 may communicate with a user device 240 associated with the cardholder 160 to obtain cardholder data 222, merchant data 224, and/or product data 226 stored and maintained at the user device 240. The user device 240 may be identified, for example, based on cardholder data 222 obtained from another computing system and/or stored and maintained at the system server 220.

Upon determining the secondary products, presentation data 232 is generated at 440 for presenting product information associated with the determined secondary products at one or more presentation devices. For example, the system server 220 may transmit the presentation data 232 to a merchant system 210 for presenting the product information to a user of the merchant system 210 (e.g., merchant 120). Additionally or alternatively, the presentation data 232 may be transmitted to a user device 240 for presenting the product information to a user of the user device 240 (e.g., cardholder 160). In some embodiments, a user of the presentation device is prompted to select at least one secondary product for enhancing the financial transaction. Upon receiving user input that indicates a selection of at least one secondary product, selection data 242 associated with the selected secondary product is generated and transmitted to the system server 220. The selection data 242 is received at the system server 220 at 450 and processed to enhance the financial transaction with the selected secondary product.

In one scenario, a grocer (i.e., a merchant 120) and a plurality of groceries (i.e., primary products) associated with the financial transaction is identified at 420. Account data associated with the cardholder 160 (e.g., age, annual income, home address) and account data associated with the grocer (e.g., business address) and/or the groceries (e.g., estimated weight) is analyzed to determine at 430 that a grocery bag service (i.e., secondary product) may be used to enhance the financial transaction. For example, the system server 220 may identify that the home address of the cardholder 160 within a predetermined delivery zone associated with the merchant 120. Additionally or alternatively, the system server 220 may generate one or more metrics associated with a likelihood that the cardholder 160 may be interested in the grocery bag service based on the age, annual income, and/or home address of the cardholder 160, and determine whether an aggregate metric satisfies a predetermined grocery bag service threshold for identifying the grocery bag service as a secondary product. Grocery bag service may include, for example, at least partially delivering the groceries from the business address of the grocer to the home address of the cardholder 160, such as loading groceries into vehicle, shipping groceries between the business address and the home address, unloading groceries from vehicle, and/or positioning groceries in the cardholder's home. Additionally or alternatively, a food preparation service, a reusable shopping bag, and/or a kitchen utensil may also be identified as being useable to enhance the financial transaction.

Figure 5:
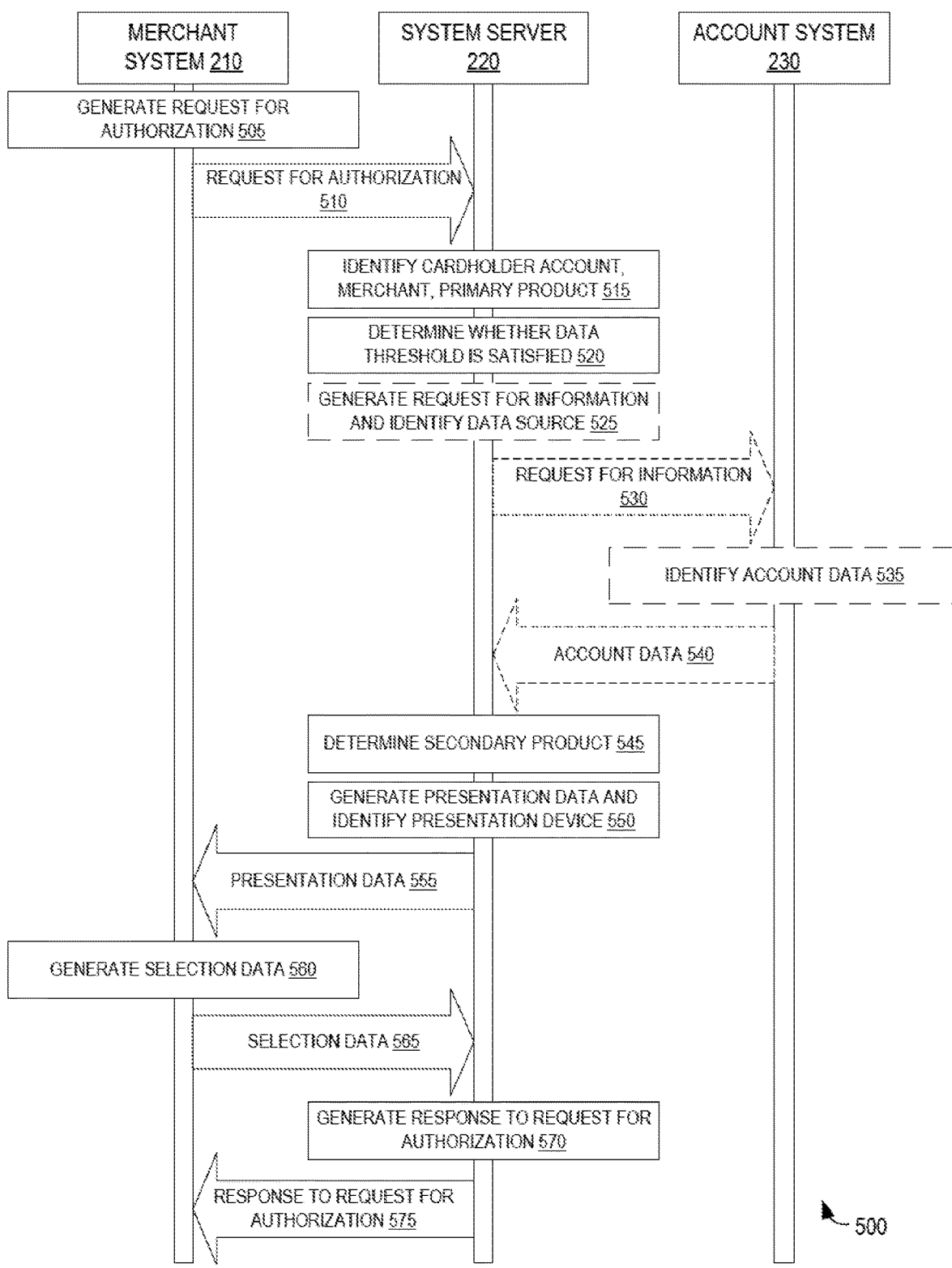
FIG. 5 is a sequence diagram for enhancing one or more financial transactions in an ecosystem, such as the ecosystem shown in FIG. 2.

FIG. 5 is a sequence diagram for an example method 500 for enhancing one or more financial transactions in an ecosystem 200 (shown in FIG. 2). In some embodiments, a merchant system 210 generates at 505 a request for authorization associated with a financial transaction, and transmits at 510 the request for authorization to a system server 220 for processing the financial transaction. The request for authorization may include, for example, account information, transaction data, merchant data 224, and/or product data 226 for authenticating or confirming an identity of a user (e.g., the cardholder 160), processing the financial transaction, and enhancing the financial transaction.

The system server 220 identifies at 515 a cardholder account used to enter into the financial transaction based on the account information, a merchant 120 associated with the financial transaction based on the merchant data 224, and/or a primary product associated with the financial transaction based on the product data 226. In some embodiments, the system server 220 determines at 520 whether the cardholder data 222 associated with the cardholder account, merchant data 224, and/or product data 226 satisfy a data threshold. The data threshold may be determined to be satisfied, for example, if the system server 220 is configured to enhance the financial transaction.

If the data threshold is not satisfied (e.g., the system server 220 is not configured to enhance the financial transaction), the system server 220 may obtain other data to enable the system server 220 to enhance the financial transaction. For example, the system server 220 may generate at 525 a request for information, identify a data source that stores and maintains account data associated with the cardholder 160 (e.g., cardholder data 222), the merchant 120 (e.g., merchant data 224), and/or the primary product (e.g., product data 226), and transmit at 530 the request for information to the identified data source. For example, the request for information may be transmitted to an account system 230. Upon receiving the request for information, the account system 230 may identify at 535 cardholder data 222, merchant data 224, and/or product data 226 in accordance with the request for information, and transmit at 540 the identified cardholder data 222, merchant data 224, and/or product data 226 to the system server 220. Additionally or alternatively, the request for information may be transmitted to and processed at any computing system that stores and maintains cardholder data 222, merchant data 224, and/or product data 226, such as the merchant system 210 and/or a user device 240 associated with the cardholder 160.

If the data threshold is satisfied (e.g., the system server 220 is configured to enhance the financial transaction), the system server 220 determines at 545 one or more secondary products that may enhance the financial transaction. In some embodiments, the system server 220 generates at 550 presentation data 232 associated with the secondary products, identifies a presentation device configured to present information, and transmits at 555 the presentation data 232 to the identified presentation device. For example, the presentation data 232 may be transmitted to the merchant system 210. Upon receiving the presentation data 232, the merchant system 210 may use the presentation data 232 to prompt a user of the merchant system 210 (e.g., merchant 120) to select at least one secondary product for enhancing the financial transaction. The merchant system 210 may generate at 560 selection data 242 associated with the selected secondary product, and transmit at 565 the selection data 242 to the system server 220. Additionally or alternatively, the presentation data 232 may be transmitted to and processed at any computing system that may present information to the cardholder 160 and/or an entity associated with the cardholder 160, such as the user device 240.

Upon receiving the selection data 242, the system server 220 may process the selection data 242 with the request for authorization associated with the financial transaction. For example, the system server 220 may process a single, enhanced financial transaction associated with the processing of both the request for authorization and the selection data 242. Alternatively, the system server 220 may separately process the request for authorization in a first financial transaction and the selection data 242 in a second financial transaction such that the selected secondary product enhances the first financial transaction. In some embodiments, a response to the request for authorization is generated at 570, and transmitted at 575 to the merchant system 210. If the selection data 242 is processed separate from the request for authorization, the system server 220 may generate and transmit a response to the selection data 242 to the merchant system 210.

Figure 6:
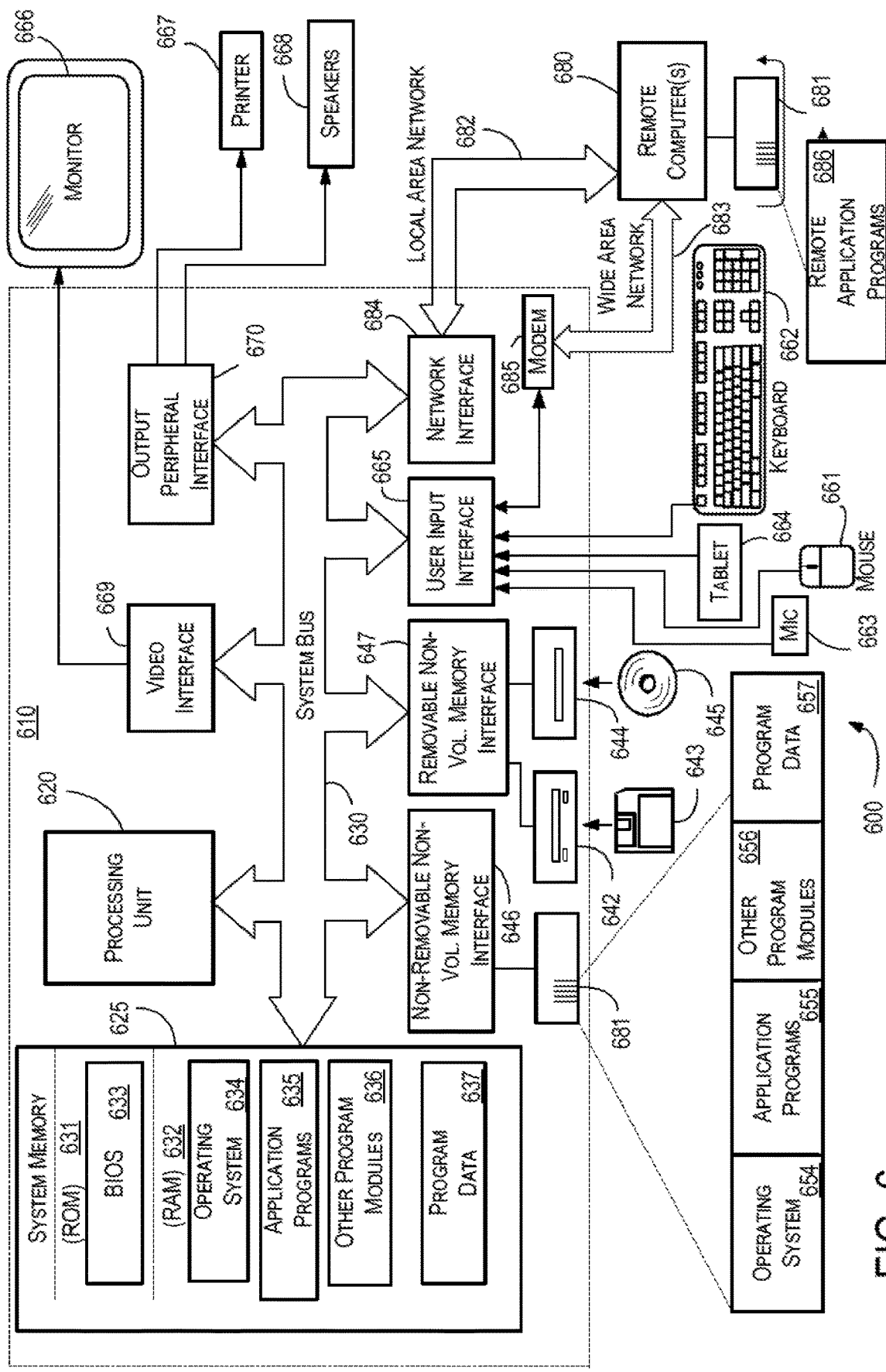
FIG. 6 is a block diagram of an example operating environment for processing one or more financial transactions.

FIG. 6 is a block diagram of an example operating environment 600 that may be used to process one or more financial transactions. The operating environment 600 is only one example of a computing and networking environment and is not intended to suggest any limitation as to the scope of use or functionality of the disclosure. The operating environment 600 should not be interpreted as having any dependency or requirement relating to any one or combination of components illustrated in the example operating environment 600.

The disclosure is operational with numerous other computing and networking environments or configurations. While some examples of the disclosure are illustrated and described herein with reference to the operating environment 600 being or including a system server 220 (shown in FIG. 2) or a computing system 300 (shown in FIG. 3), aspects of the disclosure are operable with any computing device (e.g., merchant system 210, account system 230, user device 240, interface component 310, primary transaction component 320, secondary transaction component 330) that executes instructions to implement the operations and functionality associated with the operating environment 600.

For example, the operating environment 600 may include a mobile device, a smart watch or device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 600 may represent a group of processing units or other computing devices. Additionally, any computing device described herein may be configured to perform any operation described herein including one or more operations described herein as being performed by another computing device.

With reference to FIG. 6, an example system for implementing various aspects of the disclosure may include a general purpose computing device in the form of a computer 610. Components of the computer 610 may include, but are not limited to, a processing unit 620 (e.g., a processor), a system memory 625 (e.g., a computer-readable storage device), and a system bus 630 that couples various system components including the system memory 625 to the processing unit 620. The system bus 630 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The processing unit 620 includes any quantity of processing units, and the instructions may be performed by the processing unit 620 or by multiple processors within the operating environment 600 or performed by a processor external to the operating environment 600. The processing unit 620 may be programmed to execute the computer-executable instructions for implementing aspects of the disclosure, such as those illustrated in the figures (e.g., FIGS. 4 and 5). For example, the processing unit 620 may be programmed to communicate with or execute an interface component 310 (shown in FIG. 3), a primary transaction component 320 (shown in FIG. 3), and/or a secondary transaction component 330 (shown in FIG. 3) for implementing aspects of the disclosure.

Upon programming or execution of these components, the operating environment 600 and/or processing unit 620 is transformed into a special purpose microprocessor or machine. For example, the primary transaction component 320, when executed by the processing unit 620, causes the computer 610 to identify a cardholder account used to enter into a financial transaction, and identify a merchant 120 and/or at least one primary product associated with the financial transaction; and/or the secondary transaction component 330, when executed by the processing unit 620, causes the computer 610 to determine one or more secondary products based on the identified cardholder account and the identified merchant 120 and/or primary product, generate presentation data 232 for presenting product information associated with the determined secondary products, and receive selection data 242 associated with at least one secondary product. Although the processing unit 620 is shown separate from the system memory 625, embodiments of the disclosure contemplate that the system memory 625 may be onboard the processing unit 620 such as in some embedded systems.

In some embodiments, the system memory 625 stores computer-executable instructions, authentication data, transaction data, cardholder data 222, merchant data 224, product data 226, and/or other data. The system memory 625 includes any quantity of media associated with or accessible by the processing unit 620. For example, the system memory 625 may include computer storage media in the form of volatile and/or nonvolatile memory, such as read only memory (ROM) 631 and random access memory (RAM) 632. The ROM 631 may store a basic input/output system 633 (BIOS) that facilitates transferring information between elements within computer 610, such as during start-up. The RAM 632 may contain data and/or program modules that are immediately accessible to and/or presently being operated on by processing unit 620. By way of example, and not limitation, FIG. 6 illustrates operating system 634, application programs 635, other program modules 636, and program data 637.

The computer 610 includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 631 and RAM 632 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 610. Computer storage media are implemented in hardware and exclude carrier waves and propagated signals. Any such computer storage media may be part of computer 610.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user (e.g., merchant 120, cardholder 160) may enter commands and information into the computer 610 through one or more input devices, such as a pointing device 661 (e.g., mouse, trackball, touch pad), a keyboard 662, a microphone 663, and/or an electronic digitizer 664 (e.g., tablet). Other input devices not shown in FIG. 6 may include a joystick, a game pad, a controller, a satellite dish, a camera, a scanner, an accelerometer, or the like. These and other input devices may be coupled to the processing unit 620 through a user input interface 665 that is coupled to the system bus 630, but may be connected by other interface and bus structures, such as a parallel port, game port or a universal serial bus (USB).

Information, such as text, images, audio, video, graphics, alerts, and the like, may be presented to a user via one or more presentation devices, such as a monitor 666, a printer 667, and/or a speaker 668. Other presentation devices not shown in FIG. 6 may include a projector, a vibrating component, or the like. These and other presentation devices may be coupled to the processing unit 620 through a video interface 669 (e.g., for a monitor 666 or a projector) and/or an output peripheral interface 670 (e.g., for a printer 667, a speaker 668, and/or a vibration component) that are coupled to the system bus 630, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 666 and/or touch screen panel may be physically coupled to a housing in which the computer 610 is incorporated, such as in a tablet-type personal computer.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 682 and one or more wide area networks (WAN) 683, but may also include other networks. Such networking environments are commonplace in offices, enterprise-wide computer networks, intranets and the Internet.

When used in a LAN networking environment, the computer 610 is coupled to the LAN 682 through a network interface or adapter 684. When used in a WAN networking environment, the computer 610 may include a modem 685 or other means for establishing communications over the WAN 683, such as the Internet. The modem 685, which may be internal or external, may be connected to the system bus 630 via the user input interface 665 or other appropriate mechanism. A wireless networking component including an interface and antenna may be coupled through a device, such as an access point or peer computer to a LAN 682 or WAN 683. In a networked environment, program modules depicted relative to the computer 610, or portions thereof, may be stored in the remote memory storage device. By way of example, and not limitation, FIG. 6 illustrates remote application programs 686 as residing on memory storage device 681. It may be appreciated that the network connections shown are examples and other means of establishing a communications link between the computers may be used.

The block diagram of FIG. 6 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or an entity (e.g., processor, web service, server, applications, computing device, etc.) not shown in FIG. 6.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for facilitating the enhancement of one or more financial transactions. For example, the elements illustrated in FIGS. 1-3, 5, and 6, such as when encoded to perform the operations illustrated in FIGS. 4 and 5, constitute at least an example means for identifying a cardholder account used to enter into a financial transaction (e.g., primary transaction component 320); an example means for identifying a merchant and/or at least one primary product associated with the financial transaction (e.g., primary transaction component 320); an example means for analyzing cardholder data 222 associated with the cardholder account and account data associated with the merchant (e.g., merchant data 224) and/or the primary product (e.g., product data 226) to determine one or more secondary products configured to enhance the financial transaction (e.g., secondary transaction component 330); an example means for generating presentation data 232 for presenting product information associated with the secondary products (e.g., secondary transaction component 330); and/or an example means for receiving selection data 242 associated with at least one secondary product (e.g., secondary transaction component 330).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computing system comprising:
one or more memory devices storing data associated with one or more cardholder accounts, and computer-executable instructions; and
one or more processors configured to execute the computer-executable instructions to:
identify a first cardholder account of the one or more cardholder accounts, the first cardholder account used to enter into a financial transaction;
identify at least one primary product from the financial transaction associated with groceries;
analyze cardholder data associated with the first cardholder account and account data associated with the at least one primary product to determine one or more secondary products useable with the at least one primary product;
generate presentation data for presenting via an interface component, at a presentation device, product information associated with the one or more secondary products;
receive, from the presentation device, via a communication network, selection data associated with at least one secondary product of the one or more secondary products, the at least one secondary product comprising a grocery delivery service; and
process a single payment for both the groceries and the grocery delivery service.

2. The computing system of claim 1, wherein the grocery delivery service comprises one or more of the following: loading the groceries into a vehicle of a cardholder of the first cardholder account, shipping the groceries between a grocer and an address of the cardholder, unloading the groceries from the vehicle of the cardholder at the address, and positioning the groceries within a vicinity of the address.

3. The computing system of claim 1, wherein the cardholder data associated with the first cardholder account comprises an address of a cardholder of the first cardholder account; and
wherein determining the one or more secondary products comprises:
determining the address of the cardholder is within a predetermined delivery zone associated with a grocer; and
based at least on determining the address of the cardholder is within the predetermined delivery zone associated with the grocer, determining the one or more secondary products to include the grocery delivery service.

4. The computing system of claim 1, wherein determining the one or more secondary products comprises:
generating one or more metrics for the cardholder data based on a likelihood that a cardholder is interested in the grocery delivery service;
determining that an aggregate metric from the one or more metrics exceeds a grocery delivery service threshold; and
based at least on determining that the aggregate metric exceeds the grocery delivery service threshold, determining the one or more secondary products to include the grocery delivery service.

5. The computing system of claim 1, wherein the one or more secondary products include one or more of the following: a food preparation service, a reuseable shopping bag, and a kitchen utensil.

6. The computing system of claim 1, wherein the one or more processors are further configured to execute the computer-executable instructions to:
receive a request for authorization associated with the financial transaction;
determine whether the request for authorization includes the account data associated with the one or more of the following: a grocer and the groceries;
on condition that the request for authorization does not include the account data, generate a request for the account data; and
based on the request, receive account data associated with the one or more of the following: the grocer and the groceries.

7. The computing system of claim 1, wherein the one or more processors are further configured to execute the computer-executable instructions to:
generate a request for the account data;
receive the account data; and
identify the one or more of the following: a grocer and the groceries based on the account data.

8. The computing system of claim 1, wherein the at least one secondary product is selected based on one or more characteristics associated with a cardholder of the first cardholder account.

9. The computing system of claim 1, wherein the one or more processors are further configured to execute the computer-executable instructions to:
generate a request for the cardholder data;
transmit, to an account system, the request for the cardholder data; and
receive, from the account system, the cardholder data.

10. The computing system of claim 1, wherein the one or more processors are further configured to execute the computer-executable instructions to:
generate a request for the account data;
transmit, to an account system, the request for the account data; and
receive, from the account system, the account data.

11. One or more computer storage media comprising computer-executable instructions that, when executed by one or more processors, cause the one or more processors to perform the following operations:
identify a first cardholder account from one or more cardholder accounts, the first cardholder account used to enter into a financial transaction;
identify at least one primary product from the financial transaction associated with groceries;
analyze cardholder data associated with the first cardholder account and account data associated with the at least one primary product to determine one or more secondary products useable with the at least one primary product;
generate presentation data for presenting via an interface component, at a presentation device, product information associated with the one or more secondary products;
receive, from the presentation device, via a communication network, selection data associated with at least one secondary product of the one or more secondary products, the at least one secondary product comprising a grocery delivery service; and
process a single payment for both the groceries and the grocery delivery service.

12. The one or more computer storage media of claim 11, wherein the grocery delivery service comprises one or more of the following: loading the groceries into a vehicle of a cardholder of the first cardholder account, shipping the groceries between a grocer and an address of the cardholder, unloading the groceries from the vehicle of the cardholder at the address, and positioning the groceries within a vicinity of the address.

13. The one or more computer storage media of claim 11, wherein the cardholder data associated with the first cardholder account comprises an address of a cardholder of the first cardholder account; and
 wherein determining the one or more secondary products comprises:
  determining the address of the cardholder is within a predetermined delivery zone associated with a grocer; and
  based at least on determining the address of the cardholder is within the predetermined delivery zone associated with the grocer, determining the one or more secondary products to include the grocery delivery service.

14. The one or more computer storage media of claim 11, wherein determining the one or more secondary products comprises:
 generating one or more metrics for the cardholder data based on a likelihood that a cardholder is interested in the grocery delivery service;
 determining an aggregate metric from the one or more metrics exceeds a grocery delivery service threshold; and
 based at least on determining the aggregate metric exceeds the grocery delivery service threshold, determining the one or more secondary products to include the grocery delivery service.

15. The one or more computer storage media of claim 11, wherein the one or more secondary products include one or more of the following: a food preparation service, a reuseable shopping bag, and a kitchen utensil.

16. The one or more computer storage media of claim 11, wherein the computer-executable instructions further cause the one or more processors to select the at least one secondary product based on one or more characteristics associated with a cardholder of the first cardholder account.

17. A computer-implemented method comprising:
 identifying a cardholder account used to enter into a financial transaction;
 identifying at least one primary product from the financial transaction associated with groceries;
 analyzing cardholder data associated with a first cardholder account and account data associated with the at least one primary product to determine one or more secondary products useable with the at least one primary product;
 generating presentation data for presenting via an interface component, at a presentation device, product information associated with the one or more secondary products;
 receiving, from the presentation device, via a communication network, selection data associated with at least one secondary product of the one or more secondary products, the at least one secondary product comprising a grocery delivery service; and
 processing a single payment for both the groceries and the grocery delivery service.

18. The computer-implemented method of claim 17, wherein the grocery delivery service comprises one or more of the following: loading the groceries into a vehicle of a cardholder of the first cardholder account, shipping the groceries between a grocer and an address of the cardholder, unloading the groceries from the vehicle of the cardholder at the address, and positioning the groceries within a vicinity of the address.

19. The computer-implemented method of claim 17, wherein the cardholder data associated with the cardholder account comprises an address of a cardholder of the cardholder account; and
 wherein determining the one or more secondary products comprises:
  determining the address of the cardholder is within a predetermined delivery zone associated with a grocer; and
  based at least on determining the address of the cardholder is within the predetermined delivery zone associated with the grocer, determining the one or more secondary products to include the grocery delivery service.

20. The computer-implemented method of claim 17, wherein determining the one or more secondary products comprises:
 generating one or more metrics for the cardholder data based on a likelihood that a cardholder is interested in the grocery delivery service;
 determining an aggregate metric from the one or more metrics exceeds a grocery delivery service threshold; and
 based at least on determining the aggregate metric exceeds the grocery delivery service threshold, determining the one or more secondary products to include the grocery delivery service.

\* \* \* \* \*